United States Patent
Seth et al.

(10) Patent No.: US 11,747,858 B2
(45) Date of Patent: Sep. 5, 2023

(54) WEARABLE DEVICE WITH EXPANDABLE DISPLAY STRIPS

(71) Applicant: INTERNATIONAL BUSINESS MACHINES CORPORATION, Armonk, NY (US)

(72) Inventors: Abhishek Seth, Deoband (IN); Soma Shekar Naganna, Bangalore (IN); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 116 days.

(21) Appl. No.: 17/448,210

(22) Filed: Sep. 21, 2021

(65) Prior Publication Data
US 2023/0090967 A1    Mar. 23, 2023

(51) Int. Cl.
*G06F 1/16* (2006.01)
*G04G 17/04* (2006.01)

(52) U.S. Cl.
CPC ............ *G06F 1/163* (2013.01); *G06F 1/1637* (2013.01); *G04G 17/045* (2013.01)

(58) Field of Classification Search
CPC ................................ G06F 1/163; G06F 1/1637
See application file for complete search history.

(56) References Cited

U.S. PATENT DOCUMENTS

| | | | | |
|---|---|---|---|---|
| 5,224,076 A | * | 6/1993 | Thorp | H04B 1/385 368/282 |
| 8,493,726 B2 | * | 7/2013 | Visser | G06F 1/1601 361/679.05 |
| 10,209,742 B2 | * | 2/2019 | Shin | G06F 1/1652 |
| 10,338,641 B2 | * | 7/2019 | Xia | G06F 1/1635 |
| 10,481,638 B2 | * | 11/2019 | Yoshizumi | G04G 17/045 |
| 10,606,541 B2 | * | 3/2020 | Yanagisawa | G06F 3/0443 |
| 11,314,285 B2 | * | 4/2022 | Feng | G06F 1/1652 |
| 11,315,443 B2 | * | 4/2022 | Han | G06F 1/1652 |
| 11,632,452 B2 | * | 4/2023 | Delaporte | G06F 1/1652 345/13 |
| 2016/0037608 A1 | * | 2/2016 | Ikeda | H05B 33/12 362/235 |
| 2016/0210103 A1 | * | 7/2016 | Yoshizumi | H10K 77/111 |

(Continued)

OTHER PUBLICATIONS

Jaszly, "Samsung Patents a Device With an Expandable Display During Use", https://www.gizmochina.com/201/12/30/samsung-patents-a-device-with-an-expandable-display-during-use/, Dec. 30, 2019, pp. 1-3.

(Continued)

*Primary Examiner* — Nidhi Thaker
(74) *Attorney, Agent, or Firm* — Tihon Poltavets

(57) ABSTRACT

An apparatus for a wearable device with expandable display strips, the apparatus includes a first layer with a first display panel coupled to a second layer with a second display panel, where the first display panel can extend and retract over a top surface of the second display panel. The apparatus also includes a first gear and rack mechanism coupled to the top surface of the second display panel and a bottom surface of the first display panel, where the first gear and rack mechanism is configured to extend and retrack the second layer with the second display relative to the first layer with the first display. Furthermore, the first layer and the second layer are arranged in a concentric manner.

11 Claims, 8 Drawing Sheets

(56) References Cited

U.S. PATENT DOCUMENTS

| | | | |
|---|---|---|---|
| 2016/0320871 A1* | 11/2016 | Li | G06F 1/1652 |
| 2018/0018930 A1 | 1/2018 | Pasupathi | |
| 2019/0146558 A1* | 5/2019 | Ohata | G09G 5/00 |
| | | | 361/679.21 |
| 2020/0218312 A1* | 7/2020 | Connor | G06F 1/1649 |
| 2020/0253069 A1 | 8/2020 | Cha | |
| 2021/0018879 A1 | 1/2021 | Li | |

OTHER PUBLICATIONS

Kerrigan, "17 Patents That Will Change Your Screen's Design and Display", https://interestingengineering.com/17-patents-that-will-chan. May 8, 2018, pp. 1-21.

Klamka et al., "Watch+Strap: Extending Smartwatches with Interactive Strap Displays", CHI '20: Proceedings of the 2020 CHI Conference on Human Factors in Comuting Systems, https://dl.acm.org/doi/abs/10.1145/3313831.3376199, Apr. 2020, pp. 1-15.

Tung, "Meet the expandable phone: Here's how Oppo's rollable display solves crease problem", https://www.zdnet.com/article/meet-the-expandable-phone-heres-how-o . . . , Nov. 18, 2020, pp. 1-6.

* cited by examiner

WEARABLE DEVICE WITH EXPANDABLE DISPLAY STRIPS

BACKGROUND

This disclosure relates generally to wearable devices, and in particular to wearable devices with expandable display strips.

Wearable devices, particular smartwatches, include a display for interacting with a user interface, where a size of the display is typically limited to smaller dimensions. The smaller dimensions of the display can impact how a user interacts with the user interface and can limit the type of content being displayed in the user interface. Smartwatches typically utilize flat plane displays that are fixed in shape. However, flexible displays are becoming widely available, where a flexible display can be curved and take a shape of a user's wrist that is wearing the smartwatch.

SUMMARY

A first aspect of an embodiment of the present invention discloses an apparatus for a wearable device with expandable display strips, the apparatus comprising a first layer with a first display panel coupled to a second layer with a second display panel, wherein the first display panel is capable of extending and retracting over a top surface of the second display panel. The apparatus further comprises a first gear and rack mechanism coupled to the top surface of the second display panel and a bottom surface of the first display panel, wherein the first gear and rack mechanism is configured to extend and retract the second layer with the second display relative to the first layer with the first display, wherein the first layer and the second layer are arranged in a concentric manner.

A second aspect of an embodiment of the present invention discloses a computer-implemented method comprising, determining an effective display area across at least two display panels of a wearable device, wherein a first display and a second display panel of the at least two display panels are arranged in a concentric manner; displaying, by one or more processors, content in the effective display area across the at least two display panels, wherein a first display panel overlaps a portion of a second display panel of the at least two display panels; and responsive to determining the effective area across the at least two display panels has changed, determining, by one or more processors, a new effective display area across the least two display panels.

DETAILED DESCRIPTION

Figure 1A:
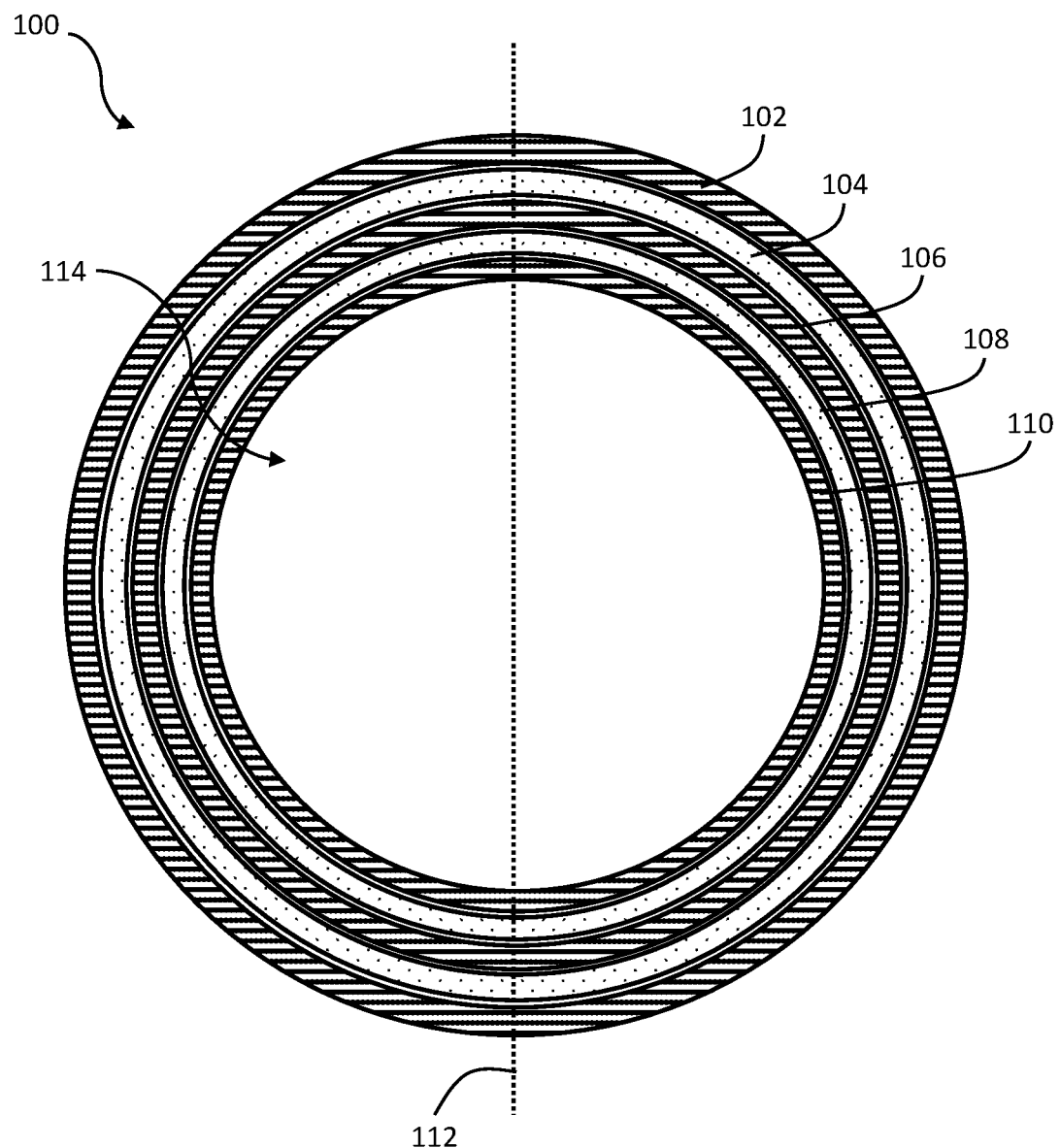
FIG. 1A illustrates a wearable device with expandable display strips in a retracted position, in accordance with an embodiment of the present invention.

Embodiments of the present invention provide a wearable device with multiple display strips of varying diameters arranged in a concentric and layered manner, where a wrist of a user is insertable within the smallest diameter of the multiple display strips. Each layer of the wearable device includes a ring with a unique diameter and a display strip for displaying content on the wearable device. Each layer includes a gear and rack mechanism for expanding each layer of the wearable device, where each gear and rack mechanism includes an electric motor configured to rotate each gear along a rack to expand and retract the multiple layers of the wearable device. Each layer of wearable device is uniquely identifiable, where a relative position of each layer is known to a relative position of each of the remaining layers of the multiple layers of the wearable device. In a retracted position, a single display strip is visible to the user associated with the wearable device, where the wearable device displays content across the single display strip. In an expanded position, two or more display strips are visible to the user associated with the wearable device, where the wearable device displays content across the two or more display strips. As a user navigates content on the wearable device, the multiple display strips can expand and retract based on the content being displayed or based on a user input, thus altering an effective display area across the multiple display strips of the wearable device.

Embodiments of the present invention track usage patterns of expanding and retracting the multiple display strips based on content being viewed by the user associated with the wearable device. Based on a historical content interaction and a duration of interaction, embodiments of the present invention identify content being viewed by the user at a specific time and a context with regards to the content being viewed. Embodiments of the present invention can predict user content consumption need and adjust the effective display area across the multiple display strips accordingly. Based on the adjusted effective display area across the multiple display strips, embodiments of the present invention determine which of the multiple layers to expand or retract for the wearable device to increase or decrease the effective display area. The user has the ability to manually expand or retract the multiple display strips by instructing the electrical motor of the gear and rack mechanism to activate and/or applying a lateral force across the multiple display strip to slide each strip from one another, thus revealing each display strip and increasing the effective display area. The wearable device can also include a gesture sensor, where an expanding and a retracting of the multiple display strips of the wearable device are controlled via gestures of the user captured by the gesture sensor. Embodiments of the present invention also provide an auto-collapsing feature for the multiple display strips, where the multiple display strips fully retract behind a single display strip due to a detection of an event (e.g., a set duration, a detection of possible impact, a rapid motion of the wearable device).

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

FIG. 1A illustrates a wearable device with expandable display strips in a retracted position, in accordance with an embodiment of the present invention. Wearable device 100 with expandable display strips includes layer 102, 104, 106, 108, and 110, where a wrist of a user is insertable into aperture 114. In this embodiment, wearable device 100 is circular in shape and dimensions of aperture 114 are defined by a diameter of an inner surface of layer 110, where layer 110 has the smallest diameter of the multiple display strips (i.e., layer 102, 104, 106, and 108) along vertical axis 112. In another embodiment, wearable device 100 is oval in shape and dimension of aperture 114 are defined by a first diameter (i.e., major axis) and a second diameter (i.e., minor axis) of an inner surface of layer 110, where layer 110 has the smallest first diameter and the smallest second diameter of the multiple display strips (i.e., layers 102, 104, 106, and 108). Layer 108 has a greater diameter than layer 110, layer 106 has a greater diameter than layer 108, layer 104 has a greater diameter than layer 106, and layer 102 has a greater diameter than layer 104. In the retracted position, layers 102, 104, 106, 108, and 110 are arranged in a concentric and layered manner, where a single display strip (i.e., layer 102) is visible to the user of wearable device 100. Vertical axis 112 represents a center line of wearable device 100 and FIG. 1B illustrates a cutaway of wearable device 100 with the expandable display strips along a plane as defined by vertical axis 112.

Each layer 102, 104, 106, 108, and 110 includes an inner and outer surface, where a display panel is present on each outer surface of layer 102, 104, 106, 108, and 110 forming the expandable multiple display strips of wearable device 100. Dimensions of the multiple display panels present on the outer surface of layers 102, 104, 106, 108, and 110 vary, since a circumference of each layer 102, 104, 106, 108, and 110 is different. In one embodiment, each display panel on the outer surface of layer 102, 104, 106, 108, and 110 is equal to 180 degrees of the outer surface, where a remaining 180 degrees represent an expandable strap to accommodate the wrist of the user within aperture 114. In another embodiment, each display panel on the outer surface of layer 102, 104, 106, 108, and 110 is equal to 140 degrees of the outer surface, where a remaining 220 degrees represent an expandable strap to accommodate the wrist of the user within aperture 114. In yet another embodiment, each display panel of the outer surface of layer 102, 104, and 106 is equal to 180 degrees of the outer surface and each panel of the outer surface of layer 108 and 110 is equal to 140, where a respectively remaining 180 degrees and 220 degrees represent an expandable strap to accommodate the wrist of the user within aperture 114. The expandable strap allows for a diameter of each layer 102, 104, 106, 108, and 110 to expand and contract to accommodate the wrist of the user inserted into aperture 114 and any subsequent movements of the wrist during day-to-day activities. The expandable strap can be rubber, stainless steel, nylon, or any type of material or combination of materials that allow for a diameter of each layer 102, 104, 106, 108, and 110 to expand and contract. The display panels of each layer 102, 104, 106, 108, and 110 and an effective display area of the displays are discussed in further detail with regards to FIGS. 3A and 3B.

The inner surface of layer 102, 104, 106, and 108 each include a gear and rack mechanism coupled to a motor and configured to expand and retract each layer 102, 104, 106, and 108 relative to layer 110. A first gear and rack mechanism with motor is positioned between layer 110 and layer 108, a second gear and rack mechanism with motor is positioned between layer 108 and layer 106, a third gear and rack mechanism with motor is positioned between layer 106 and layer 104, and a fourth gear and rack mechanism with motor is positioned between layer 104 and layer 102. Each of the gear and rack mechanisms with motors operate independently with respect to one another, where each layer 102, 104, 106, and 108 can expand and retract any distance and independently with respect to one another. The inner surface of layer 102, 104, 106, and 108 can also include an anti-friction coating to assist with the expansion and retraction.

Figure 1B:
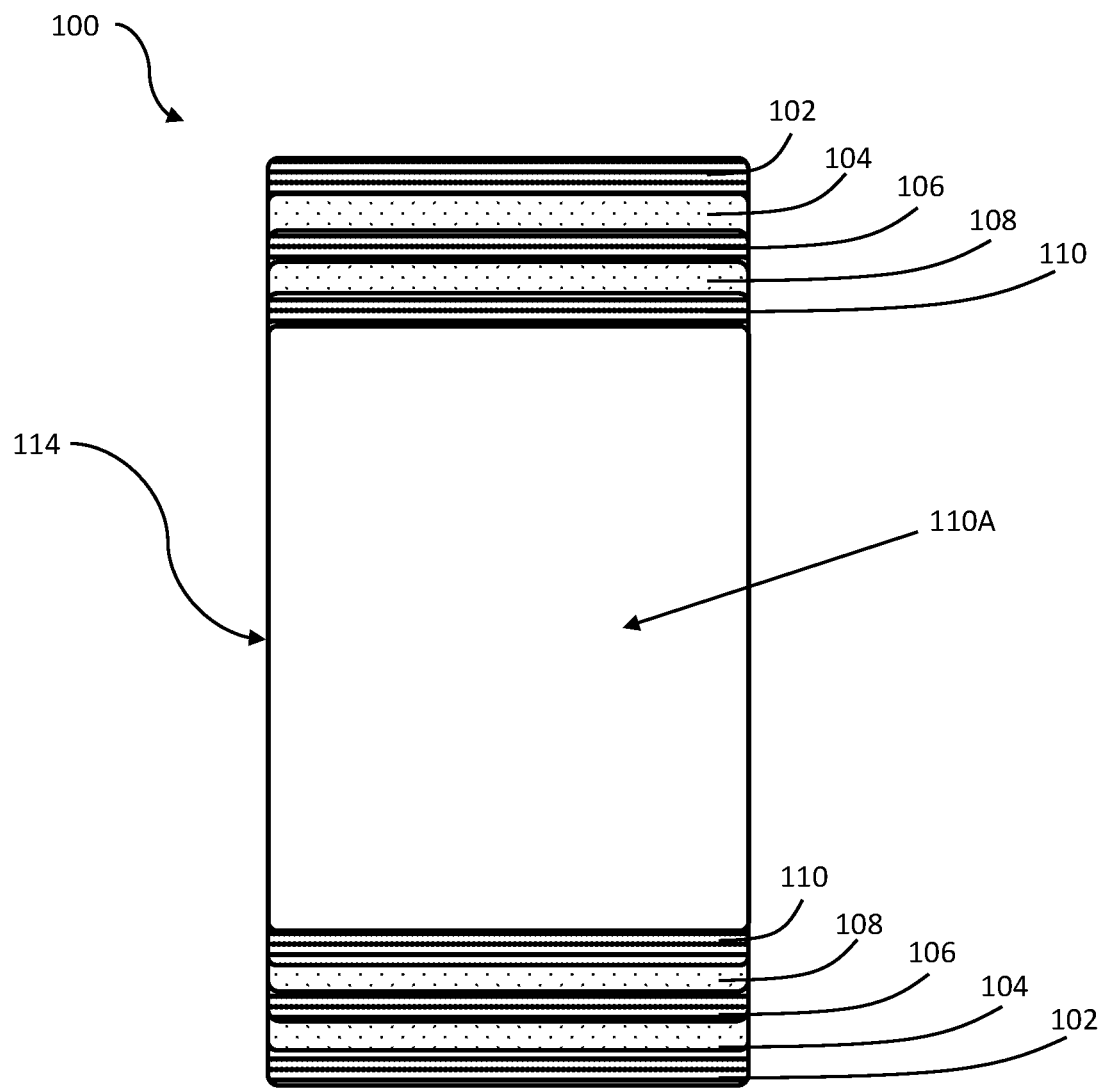
FIG. 1B illustrates a cutaway of a wearable device with expandable display strips in a retracted position, in accordance with an embodiment of the present invention.

FIG. 1B illustrates a cutaway of a wearable device with expandable display strips in a retracted position, in accordance with an embodiment of the present invention. In the illustrated embodiment, layers 102, 104, 106, 108, and 110 of wearable device 100 are in a retracted position, where a display panel on the outer surface of layer 102 is visible. Inner surface 110A of layer 110 represents a surrounding wall of aperture 114, where the user inserts a wrist into aperture 114 of wearable device 100 with the expandable display strips. A volume enclosed by an inner surface, an outer surface, and both sides of each layer 102, 104, 106, 108, and 110 houses electronic components of wearable device 100, as discussed with respect to FIGS. 4 and 6. In this embodiment, layers 102, 104, 106, 108, and 110 are mechanically coupled to one another via the multiple gear and rack mechanism and layers 102, 104, 106, 108, and 110 are electrically coupled to one another utilizing one or more sliding electrical connectors. In another embodiment, layers 102, 104, 106, 108, and 110 are mechanically coupled to one another via the multiple gear and rack mechanism, but layers 102, 104, 106, 108, and 110 are not electrically coupled to one another. Each layer 102, 104, 106, 108, and 110 operate independently, each having an independent power source (e.g., lithium-ion battery) and a communication module. Though the illustrative embodiment shows layers 102, 104, 106, 108, and 110 having equal widths, layers 102, 104, 106, 108, and 110 can having varying width in other embodiments depending on a design and desired fitment of wearable device 100.

Figure 1C:
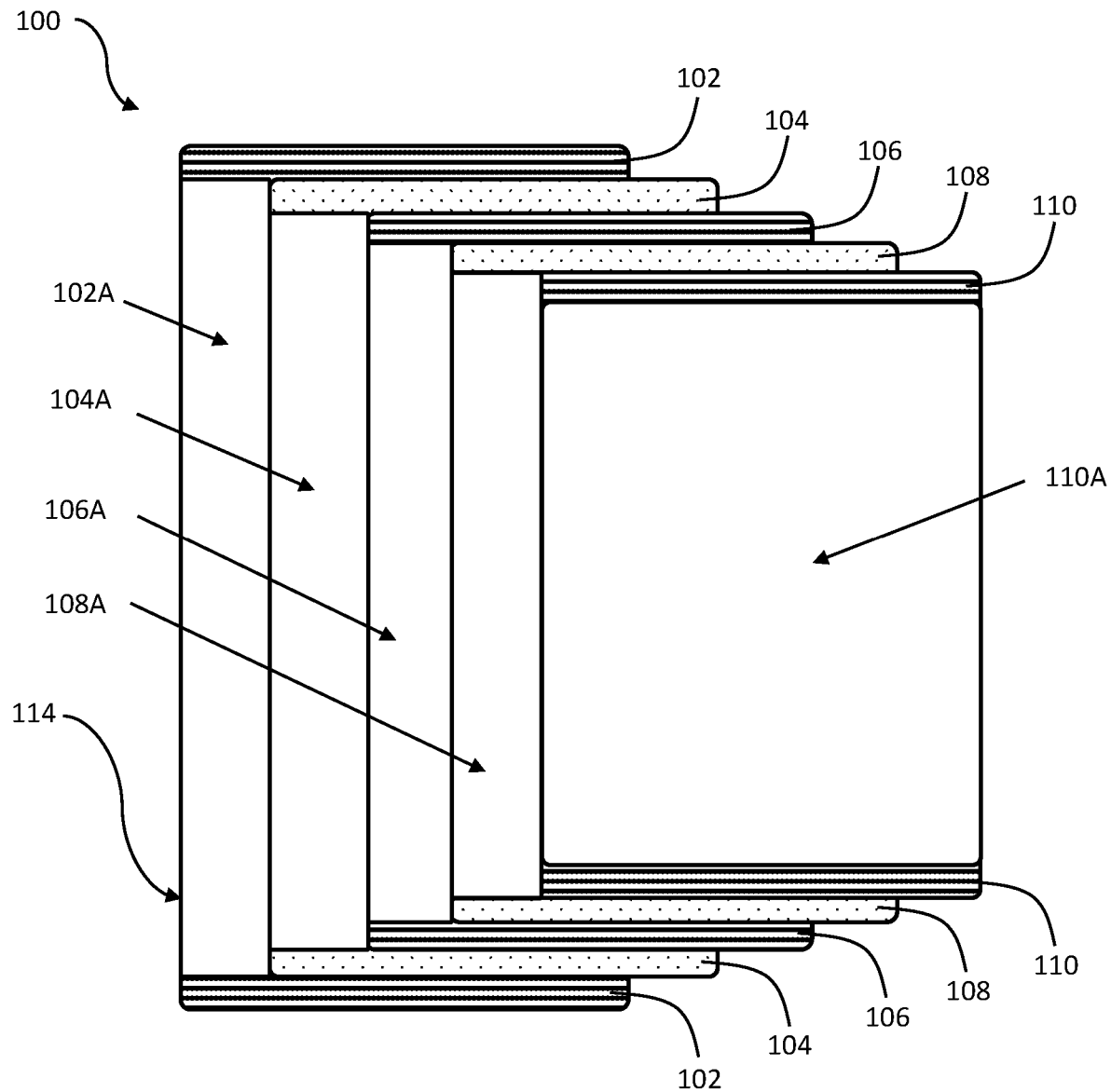
FIG. 1C illustrates a cutaway of a wearable device with expandable display strips in an extended position, in accordance with an embodiment of the present invention.

FIG. 1C illustrates a cutaway of a wearable device with expandable display strips in an extended position, in accordance with an embodiment of the present invention. In the illustrated embodiment, layers 104, 106, 108, and 110 of wearable device 100 are in an extended position, where a display panel on the outer surface of layer 102 is visible and a portion of a display panel on each of the outer surface of layer 104, 106, 108, and 110 is visible to the user of wearable device 110. It is to be noted, layers 104, 106, 108, and 110 of wearable device 100 are partially extended, where layers 104, 106, 108, and 110 can further extend out from under layer 102 to increase an effective display area across the display panel on each outer surface of layer 104, 106, 108, and 110. As previously discussed in FIG. 1B, inner surface 110A of layer 110 represents a surrounding wall of aperture 114, where the user inserts a wrist into aperture 114 of wearable device 100 with the expandable display strips. In the extended position, inner surface 108A of display 108, inner surface 106A of display 106, inner surface 104A of display 104, and inner surface 102A of display 102, of wearable device 100 become partially exposed. A combination of inner surface 102A, 104A, 106A, 108A, and 110A represent the surrounding wall of aperture 114, where the user inserts the wrist into aperture 114 of wearable device 100 with the expandable display strips. Layers 104, 106, 108, and 110 of wearable device 100 extend and retract in a lateral direction, along a wrist of the user within aperture 114.

A first gear and rack mechanism with motor is positioned between layer 110 and layer 108, where the first gear and rack mechanism with motor is configured to extend and retract layer 110 out from under layer 108 along inner surface 108A of layer 108. A second gear and rack mechanism with motor is positioned between layer 108 and layer 106, where the second gear and rack mechanism with motor is configured to extend and retract layer 108 out from under layer 106 along inner surface 106A of layer 106. A third gear and rack mechanism with motor is positioned between layer 106 and layer 104, where the third gear and rack mechanism with motor is configured to extend and retract layer 106 out from under layer 104 along inner surface 104A of layer 104. A fourth gear and rack mechanism with motor is positioned between layer 104 and layer 102, where the fourth gear and rack mechanism with motor is configured to extend and retract layer 104 out from under layer 102 along inner surface 102A of layer 102.

Figure 2A:
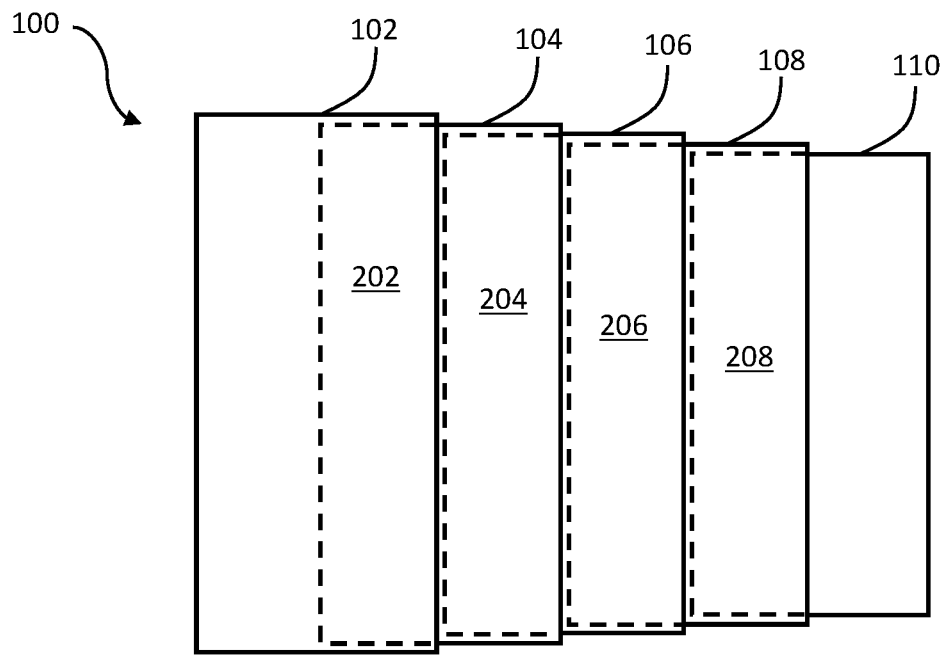
FIG. 2A illustrates a side view of a wearable device with expandable display strips in a partially extended position, in accordance with an embodiment of the present invention.

FIG. 2A illustrates a side view of a wearable device with expandable display strips in a partially extended position, in accordance with an embodiment of the present invention. In the illustrated embodiment, layers 104, 106, 108, and 110 of wearable device 100 are in a partially extended position, where a display panel on the outer surface of layer 102 is visible and a portion of a display panel on each of the outer surface of layer 104, 106, 108, and 110 is visible to the user of wearable device 110. The partially extended position of wearable device 100 illustrates a hidden portion of a display panel on each layer 104, 106, 108, and 110. As previously discussed, each layer 104, 106, 108, and 110 can extend and retract independently from one another, where layers 104, 106, 108, and 110 are not required to extend or retract in a staggered manner. For example, wearable device 100 can extend layer 106 out from under stacked layers 102 and 104, while the remaining layers 104, 108, and 110 remain retracted. In another example, wearable device 100 can extend layer 104 out from under layer 102 and layer 108 out from under layer 106, where the remaining layers 106 and 110 remain retracted. Area 202 represent a hidden portion of layer 104 covered by layer 102, where area 202 represents a ring around an outer surface of layer 104. Area 204 represent a hidden portion of layer 106 covered by layer 104, where area 204 represents a ring around an outer surface of layer 106. Area 206 represent a hidden portion of layer 108 covered by layer 106, where area 206 represents a ring around an outer surface of layer 108. Area 208 represent a hidden portion of layer 110 covered by layer 108, where area 208 represents a ring around an outer surface of layer 110.

Figure 2B:
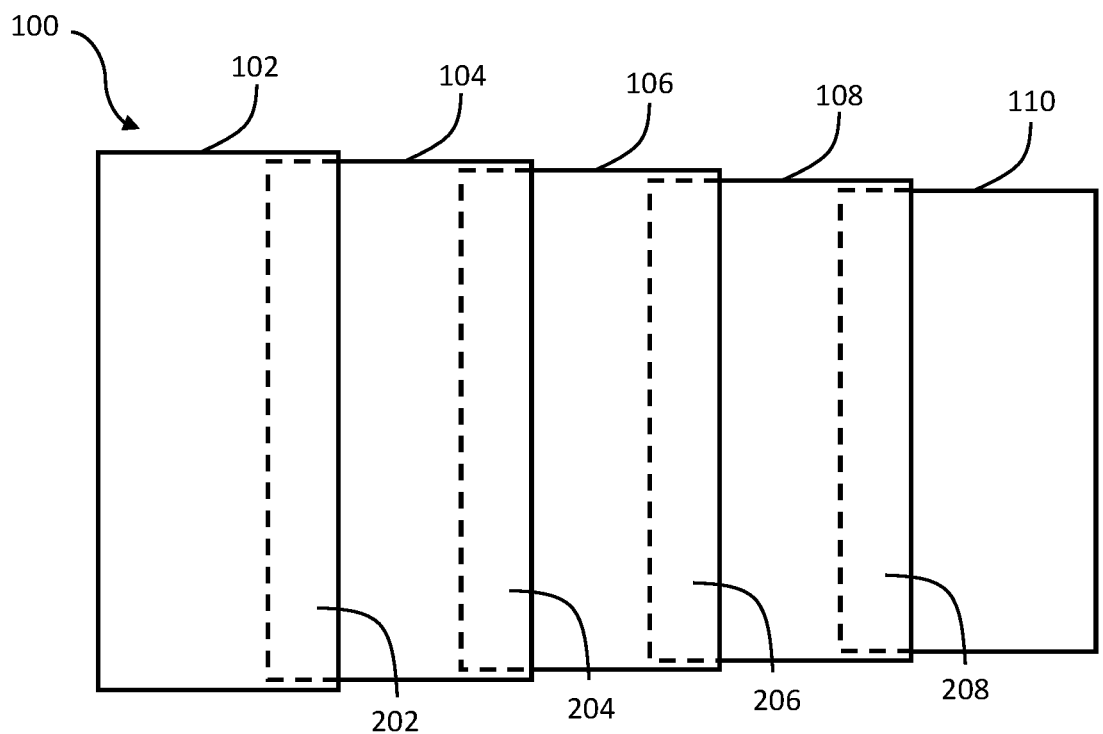
FIG. 2B illustrates a side view of a wearable device with expandable display strips in an extended position, in accordance with an embodiment of the present invention.

FIG. 2B illustrates a side view of a wearable device with expandable display strips in an extended position, in accordance with an embodiment of the present invention. In the illustrated embodiment, layers 104, 106, 108, and 110 of wearable device 100 are in an extended position, where a display panel on the outer surface of layer 102 is visible and a portion of a display panel on each of the outer surface of layer 104, 106, 108, and 110 is visible to the user of wearable device 110. As layers 104, 106, 108, and 110 extended further out, an effective display area increases and areas 202, 204, 206, and 208 decrease. As a result, an outer surface of layer 104, 106, 108, and 110 with a respective display panel become more visible to the user, thus increasing the effective display area. In one embodiment, a user has the ability to define an extended position for each of the layers 104, 106, 108, and 110 based on user preference for view content across all the display panels and/or based on a comfort level on the wrist of the user. For example, if a user has smaller diameter wrist and a smaller forearm length, a fully extended position of each layer 104, 106, 108, and 110 might be less than a fully extended position of each layer 104, 106, 108, and 110 for a user with a larger diameter wrist and a larger forearm length. In another embodiment, display program 406 (discussed in further detail with regards to FIG. 4) dictates a fully extended position of each layer 104, 106, 108, and 110 based on content being displayed across the display panels of layers 102, 104, 106, 108, and 110.

Figure 3A:
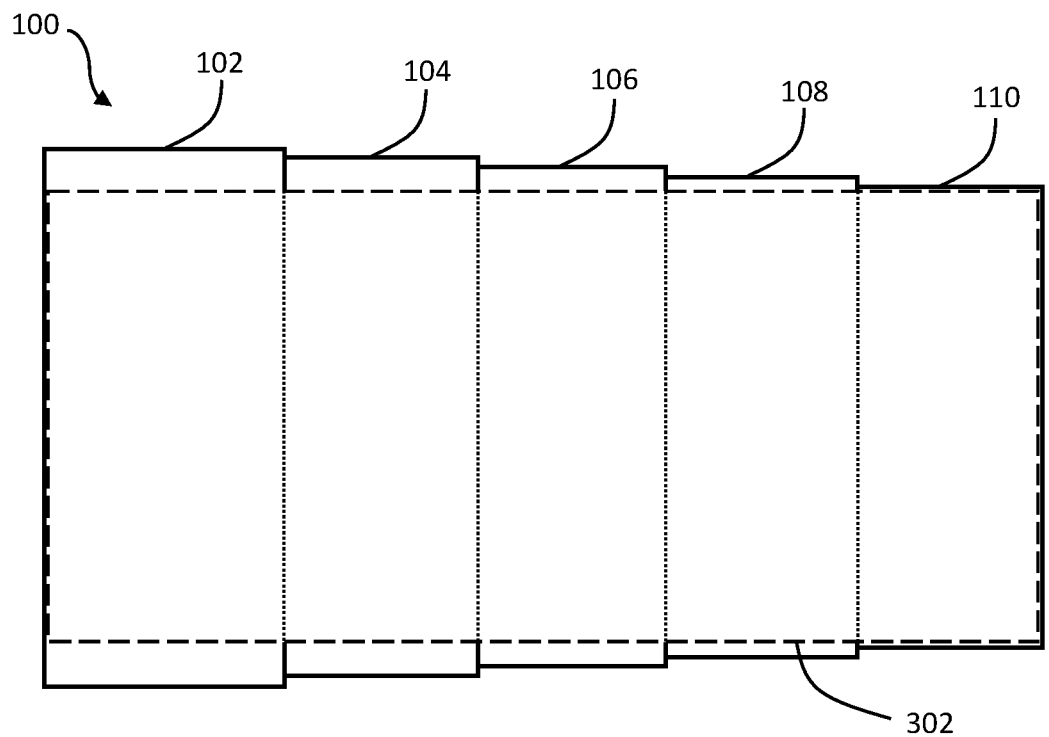
FIG. 3A illustrates a side view of a wearable device with expandable display strips in an extended position with a single display area, in accordance with an embodiment of the present invention.

FIG. 3A illustrates a side view of a wearable device with expandable display strips in an extended position with a single display area, in accordance with an embodiment of the present invention. In the illustrated embodiment, display 302 represents a single effective display area across layers 102, 104, 106, 108, and 110. As wearable device 100 with the expandable display strips extends and retracts, the single effective display area of display 302 changes accordingly, where a width of the single effective display area changes but a height of the single effective display area remains constant. Display 302 represents a single dimension varying effective display area across which content is displayed. Each display panel on layer 102, 104, 106, 108, and 110 can be a flexible and/or fixed shaped touch screen, where the touch screen allows for wearable 100 device to determine how much of each display panel is visible to the user. A portion of each display panel not visible to user is deactivated and/or not part of the effective display area for displaying content to the user. For example, a portion of a display panel of layer 104 covered by layer 102 is deactivated and/or not part of the effective display area for displaying content to the user. A leading edge of a first layer on a side from which a second layer extends and retracts from underneath the first layer can include a ridge for contacting the touch screen of the display panel on the second layer. The ridge of the first layer represents the transition between a visible portion of the display panel of the second layer and a nonvisible portion of the display panel of the second layer.

Figure 3B:
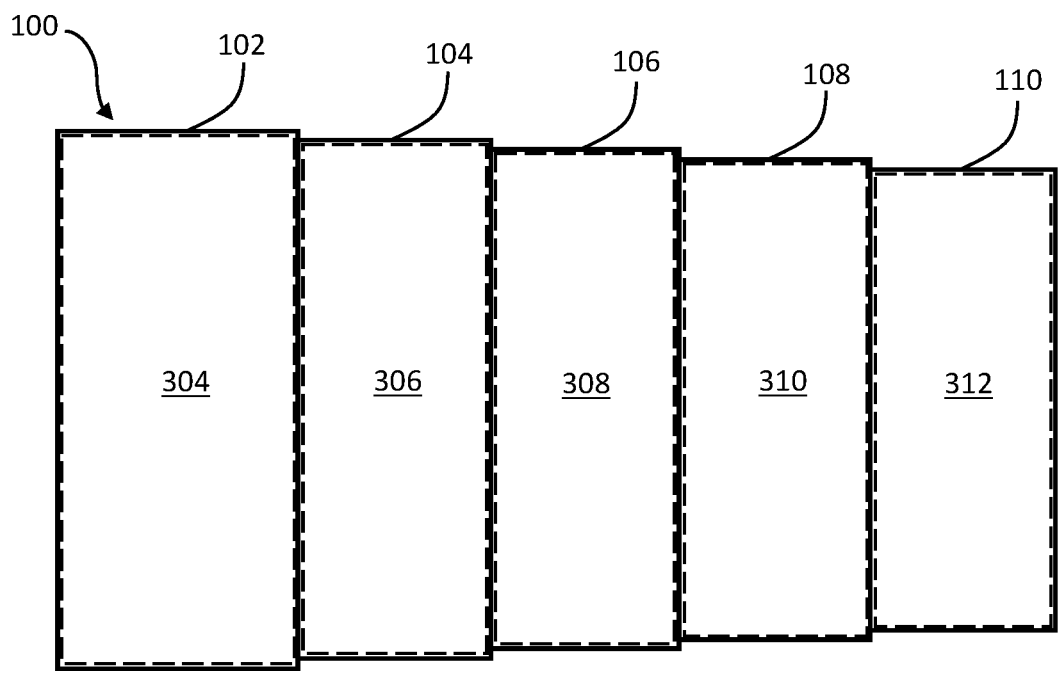
FIG. 3B illustrates a side view of a wearable device with expandable display strips in an extended position with multiple display areas, in accordance with an embodiment of the present invention.

FIG. 3B illustrates a side view of a wearable device with expandable display strips in an extended position with multiple display areas, in accordance with an embodiment of the present invention. In the illustrated embodiment, display 304, 306, 308, 310, and 312 represents a single effective display area across layers 102, 104, 106, 108, and 110. A combination of display 304, 306, 308, 310, and 312 can represent a single dimension varying effective display area across which content is displayed or each display 304, 306, 308, 310, and 312 can represent a single dimension varying effective display area across. For example, a single user interface can be displayed on wearable device 100 across the single dimension varying effective display area of the combination of display 304, 306, 308, 310, and 312. In another example, a single user interface can be displayed on the single dimension varying effective display area of each display 304, 306, 308, 310, and 312, where up to five different user interfaces are visible to the user of wearable device 100. One or more effective display areas are customizable across the display panels of layers 102, 104, 106, 108, and 108 based on user preference or based on the content being displayed to the user of wearable device 100. For example, a first effective display area for displaying a first user interface is present across the display 304 and 306 of layer 102 and 104, respectively. A second effective display area for displaying a second user interface is present across display 308, 310, and 312 of layer 106, 108, and 110, respectively.

Figure 4:
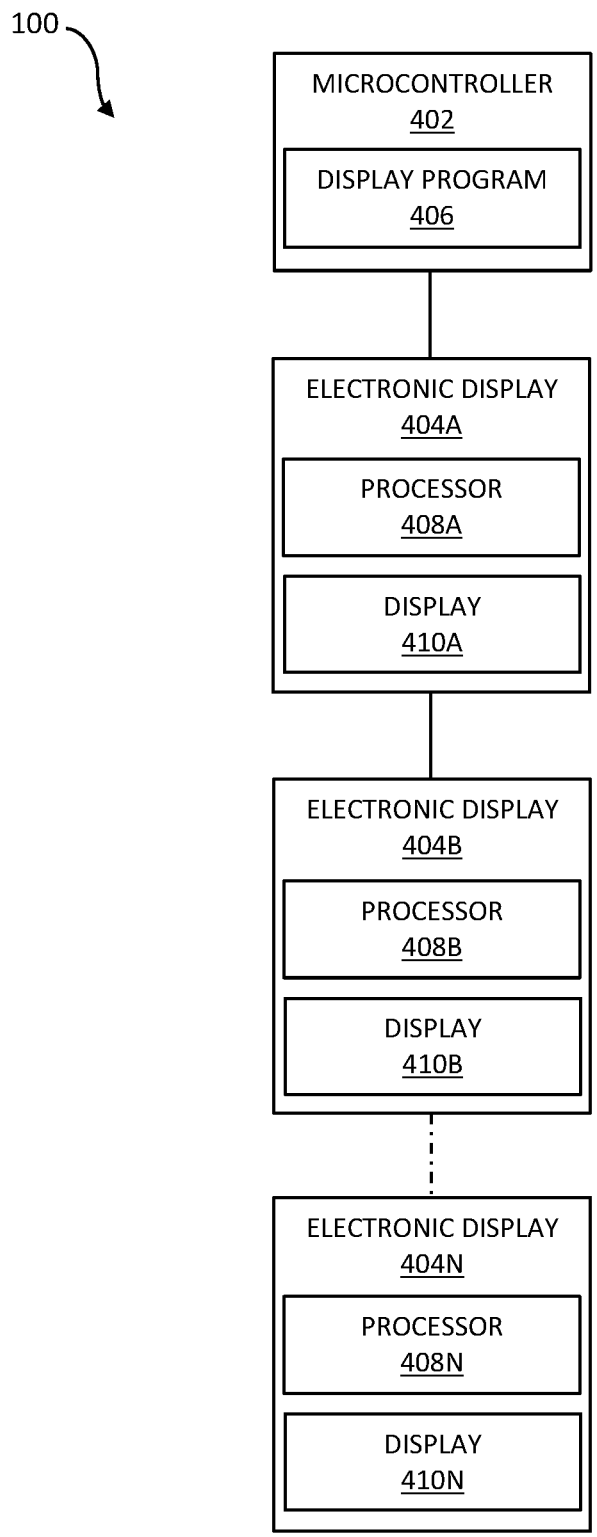
FIG. 4 is a functional block diagram illustrating a distributed data processing environment, in an embodiment, in accordance with the present invention.

FIG. 4 is a functional block diagram illustrating a distributed data processing environment, in an embodiment in accordance with the present invention. The distributed data processing environment includes wearable device 100 with microcontroller 402, electronic device 404A, electronic device 404B, and electronic device 404N.

Microcontroller 402 includes display program 406 for determining an effective display area for a number of display panels (e.g., electronic device 404A and 404B) configured in a concentric and layered manner. Display program 406 has the ability to determine an effective display area for each of display 410A, 410B, and 410N of electronic device 404A, 404B, and 404N, respectively. It is to be noted, electronic display 404N, processor 408B, and display 410N represent an n$^{th}$ number of each of the respective items (e.g., fifth electronic display, a fifth processor, a fifth display). Display program 406 can display content in the effective display area on each of display 410A, 410B, and 410N, where the content is displayed as a single image (e.g., a single user interface) across display 410A, 410B, and 410N. Display program 406 can determine whether the effective display area has changed and determine a new effective display area for displaying content in display 410A, 410B, and 410N. Subsequently, display program 406 displays content in the new effective display area in display 410A, 410B, and 410C of electronic device 404A, 404B, and 404N, respectively.

Electronic device 404A, 404B, 404N may be any programmable computer system known in the art representing a display panel. Electronic device 404A, 404B, 404N includes processors 408A, 408B, and 408N, respectively, and may include a client based display program 406, not illustrated in FIG. 4. In general, electronic device 404A, 404B, 404N is representative of any programmable electronic device or combination of programmable electronic devices capable of executing machine-readable program instructions and communicating with users of other electronic devices via a network (local or remote). Electronic device 404A, 404B, 404N may include components, as depicted and described in further detail with respect to FIG. 6, in accordance with embodiments of the present invention.

Electronic device 404A, 404B, 404N also includes display 410A, 410B, and 410N, respectively for display content to a user. Display 410A, 410B, and 410N each include a touchscreen as an input and output device layer on top of an electronic visual display. This input and output device layer allows for each of processor 408A, 408B, and 408N to determine an overlaying configuration of electronic device 404A, 404B, and 404N. Processor 408A, 408B, and 408N can send the determined overlaying configuration of electronic device 404A, 404B, and 404N to microcontroller 402, where display program 406 can determine an effective display area for display 410A, 410B, and 410N. Electronic device 404N, processor 408N, and display 410N represent an electronic device, processor and display combination further along wearable device 100.

Figure 5:
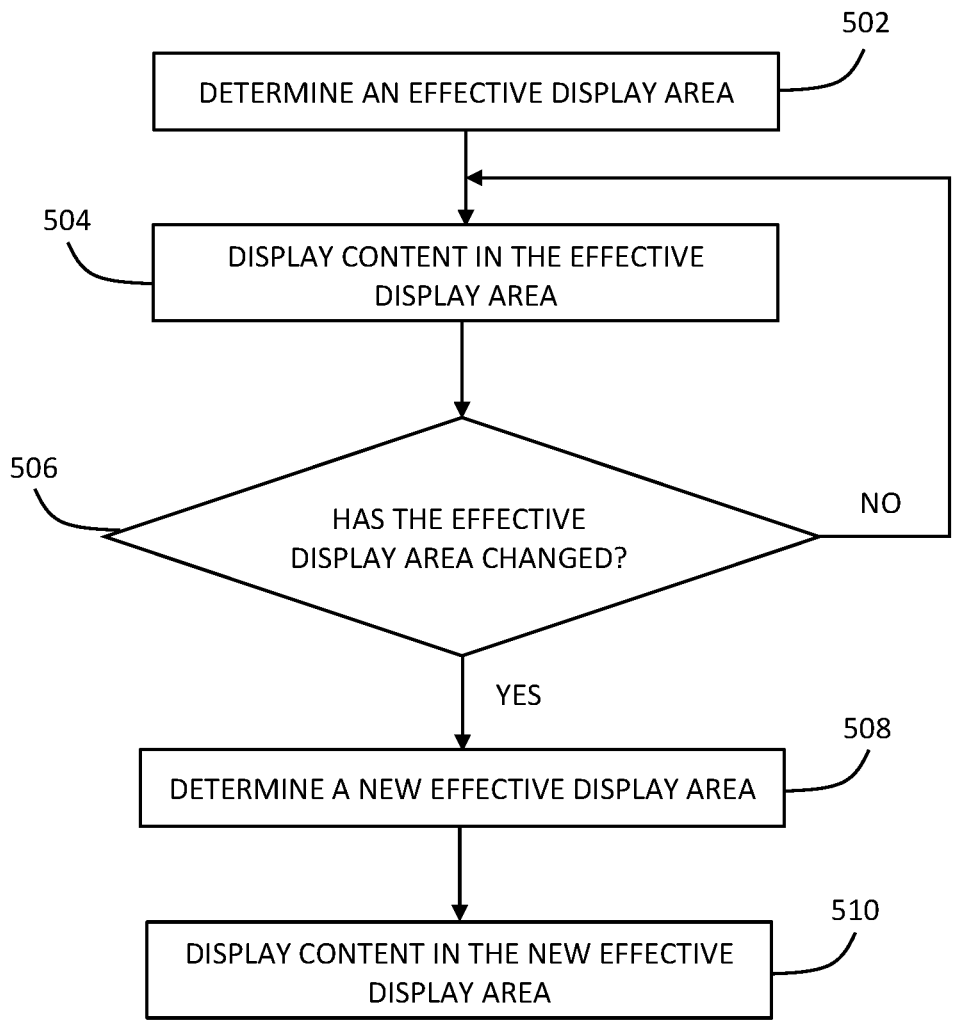
FIG. 5 is a flowchart depicting operational steps of a display program for determining an effective display area of an extendable display strip, in accordance with one embodiment of the present invention.

FIG. 5 is a flowchart depicting operational steps of a display program for determining an effective display area of an extendable display strip, in accordance with one embodiment of the present invention.

Display program 406 determines an effective display area (502). In this embodiment, display program 406 determines an initial effective display area across a plurality of display panels arranged in a concentric and layered manner of wearable device 100. Display program 406 can query a processor associated with each display panel out of the plurality of display panels to determine an overlaying configuration of the plurality of display panels. For example, a first display panel (e.g., electronic device 404A) overlays a second display panel (e.g., electronic device 404B), where the first display panel covers a portion of the second display panel. The second display panel overlays a third display panel (i.e., electronic device 404N), where the second display panel covers a portion of the third display panel.

A first processor (e.g., processors 408A) of the first display panel can determine via an input and output device layer that no portion of the first display panel is obstructed and the entire first display panel includes a visible portion viewable by a user. A second processor (e.g., processors 408B) of the second display panel can determine via an input and output device layer that an obstructed portion of the second panel is not viewable by the user and a visible portion of the second panel is viewable by the user. A third processor (e.g., processors 408N) of the third display panel can determine via an input and output device layer that an obstructed portion of the third panel is not viewable by the user and a visible portion of the third panel is viewable by the user. Display program 406 can receive this information from the first processor, the second processor, and the third processor and determine an effective display area covering the visible portions of the first display panel, the second display panel, and the third display panel.

Display program 406 displays content in the effective display area (504). In this embodiment, display program 406 displays content in the effective display area covering the visible portions of the first display panel, the second display panel, and the third display panel. display program 406 can utilize a maximum amount of a display area visible to the user (i.e., effective display area), while conserving power by not displaying any content in a display area not visible to the user.

Display program 406 determines whether the effective display area has changed (506). In the event, display program 406 determines the effective display area has changed ("yes" branch, 506), display program 406 determines a new effective display area (510). In the event, display program 406 determines the effective display area has not changed ("no" branch, 506), display program 406 reverts back to displaying the content in the effective display area (504).

In this embodiment, display program 406 determines whether the effective display area has changed based on information display program 406 receives from the first processor, the second processor, and the third processor of the first display panel, the second display panel, and the third display panel. Since each display panel includes an input and output device layer on top of an electronic visual display, display program 406 has the ability to determine if any one of the display panels is obstructed in such a manner that a portion of the display is no longer visible to the user or is exposed in such a manner that a portion of the display is now visible to the user.

Display program 406 determines a new effective display area (508). In this embodiment, display program 406 determines a new effective display area across the first, the second, and the third display panels. Display program 406 can receive information from the first processor, the second processor, and the third processor and determine the new effective display area covering the visible portions of the first display panel, the second display panel, and the third display panel.

Display program 406 displays content in the new effective display area (510). In this embodiment, display program 406 displays content in the effective display area covering the visible portions of the first display panel, the second display panel, and the third display panel. By displaying content in the new effective display area, display program 406 has the ability to continuously adjustment the display of content in an effective display area that is constantly changing. In one embodiment, display program 406 has the ability to maintain a constant aspect ratio (e.g., 16:9) as an initial effective display area changes to a new effective display area. In another embodiment, display program 406 has the ability to alter content being display to maximize the utilization of the new effective display area. Display program 406 has the ability to display content on a larger effective display area by rearranging content to better maximize the utilization of the greater effective display area. For example, content that display program 406 may have been previously displaying in a layered manner (i.e., multiple lines), can now be displayed in a single line to maximize an increase in length or width provided by the greater effective display area.

Figure 6:
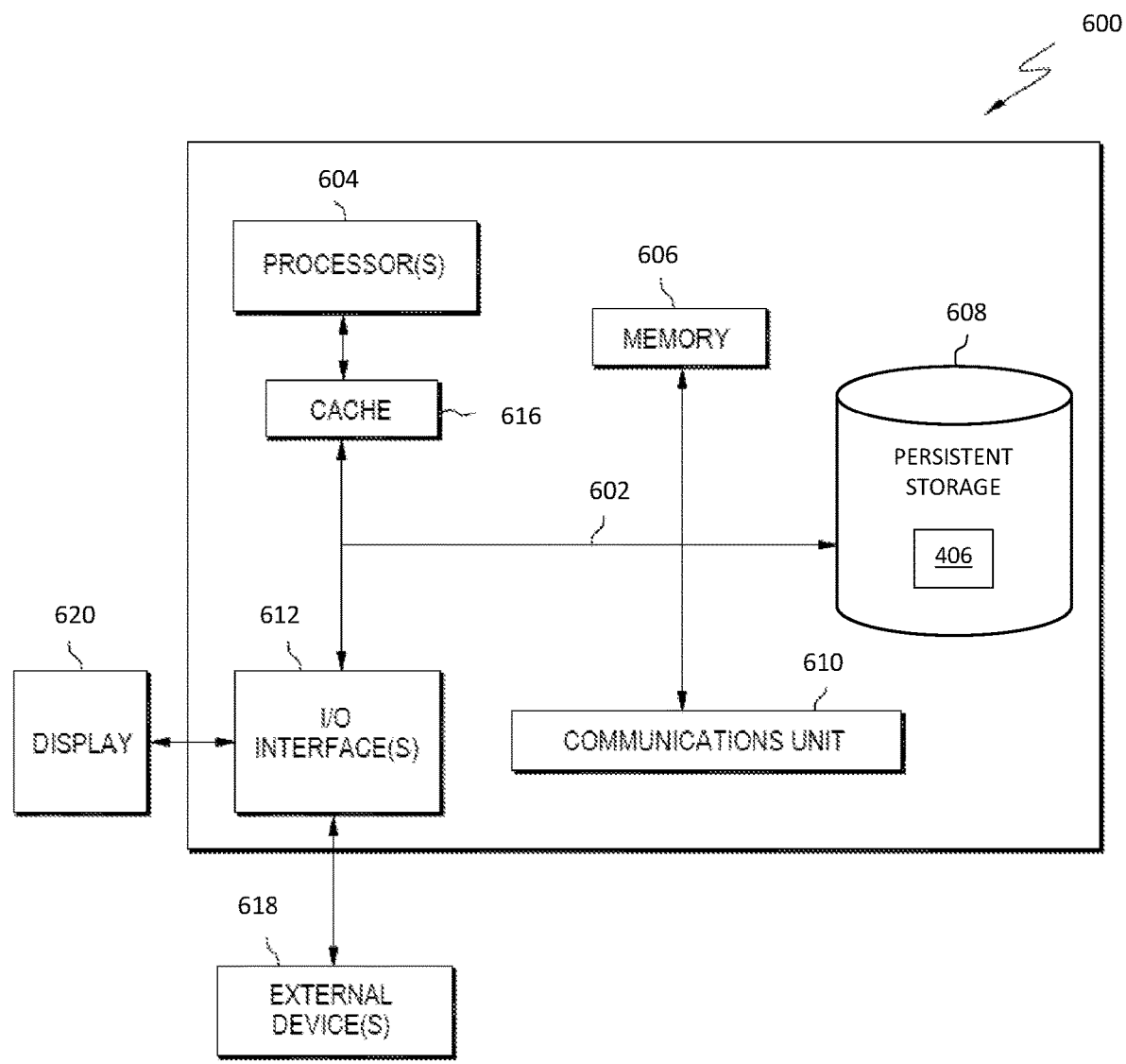
FIG. 6 depicts a block diagram of components of a computer system, such as a microcontroller of FIG. 4, in an embodiment, in accordance with the present invention.

FIG. 6 depicts computer system 600, where embedded microcontroller 404 is an example of computer system 600 that includes display program 406 in persistent storage 608. The computer system includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 602 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 606 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An apparatus for a wearable device with expandable display strips, the apparatus comprising: a first layer including a portion with a first display panel and another portion with a first expandable strap; a second layer including a portion with a second display panel, and another portion with a second expandable strap; the first layer is coupled to the second layer, wherein the first display panel is capable of extending and retracting over a top surface of the second display panel, wherein the first expandable strap and the second expandable strap are configured to accommodate a wrist of user through an aperture of the wearable device with the expandable display strips; and a first gear and rack mechanism coupled to the top surface of the second display panel and a bottom surface of the first display panel, wherein the first gear and rack mechanism is configured to extend and retract the second layer with the second display relative to the first layer with the first display, wherein the first layer and the second layer are arranged in a concentric manner.

2. The apparatus of claim 1, further comprising:
a first motor coupled to the first gear and rack mechanism configured to extend and retract the second layer with the second display relative to the first layer with the first display.

3. The apparatus of claim 1, further comprising: the aperture defined by a first inner surface of the first layer with the first display panel and a second inner surface of the second layer with the second display panel.

4. The apparatus of claim 3, wherein the first layer and the second layer are circular in shape.

5. The apparatus of claim 4, wherein an effective display area is defined by the first display panel of the first layer and a portion of the second display panel of the second layer extended from underneath the first display panel.

6. The apparatus of claim 5, wherein a diameter of the first layer is greater than a diameter of the second layer.

7. The apparatus of claim 6, wherein each of the first expandable strap and the second expandable strap is of a material selected from a group consisting of: rubber, stainless steel, and nylon.

8. The apparatus of claim 3, wherein the first layer and the second layer are oval in shape.

9. The apparatus of claim 8, wherein an effective display area is defined by the first display panel of the first layer and a portion of the second display panel of the second layer extended from underneath the first display panel.

10. The apparatus of claim 9, wherein a first diameter of the first layer is greater than a first diameter of the second layer and a second diameter of the first layer is greater than a second diameter of the second layer.

11. The apparatus of claim 10, wherein each of the first expandable strap and the second expandable strap is of a material selected from a group consisting of: rubber, stainless steel, and nylon.

* * * * *